(12) United States Patent
Lee

(10) Patent No.: US 6,795,126 B1
(45) Date of Patent: Sep. 21, 2004

(54) METHOD AND SYSTEM FOR ADAPTIVE THREE-DIMENSIONAL COLOR TELEVISION Y/C SEPARATION COMB FILTER DESIGN

(75) Inventor: Jooho Lee, Campbell, CA (US)

(73) Assignee: NDSP Corporation, Campbell, CA (US)

( * ) Notice: Subject to any disclaimer, the term of this patent is extended or adjusted under 35 U.S.C. 154(b) by 459 days.

(21) Appl. No.: 10/036,252

(22) Filed: Dec. 14, 2001

(51) Int. Cl.$^7$ ................................................. H04N 9/78
(52) U.S. Cl. ........................................ 348/663; 348/665
(58) Field of Search ........................... 348/663, 665, 348/667, 670; H04N 9/78, 9/77

(56) References Cited

U.S. PATENT DOCUMENTS

| | | | | |
|---|---|---|---|---|
| 5,231,478 A | * | 7/1993 | Fairhurst | 348/663 |
| 5,990,978 A | * | 11/1999 | Kim et al. | 348/663 |
| 6,188,445 B1 | * | 2/2001 | Taketani | 348/663 |
| 6,504,579 B1 | * | 1/2003 | Scherrer | 348/667 |

* cited by examiner

*Primary Examiner*—Sherrie Hsia
(74) *Attorney, Agent, or Firm*—Marger Johnson & McCollom, P.C.

(57) ABSTRACT

Method and system for an adaptive three-dimensional Y/C comb filter are disclosed. A composite TV signal is input into a color decoder. A first decision-making module determines if an edge passing through a current sample pixel is a color or colorless edge. If the edge is colorless, a second decision-making module determines if the edge is lying vertically, horizontally, or temporally. Once the second decision-making module determines the direction in which the edge lies, the module applies an appropriate Y/C comb filter to the input composite TV signal. If the edge is a color edge, a third decision-making module determines if the edge is lying vertically, horizontally, or temporally. Once the third decision-making module determines the direction in which the edge lies, the module applies an appropriate Y/C comb filter to the input composite TV signal.

30 Claims, 6 Drawing Sheets

METHOD AND SYSTEM FOR ADAPTIVE THREE-DIMENSIONAL COLOR TELEVISION Y/C SEPARATION COMB FILTER DESIGN

BACKGROUND INFORMATION

1. Field of Invention

The present invention relates to separation of Luminance (Y) and Chrominance (C) in a TV composite signal, particularly to the design of an adaptive three-dimensional luminance/chrominance (Y/C) separation comb filter.

2. Description of Related Art

A typical color TV decoder receives composite TV signals as input. The color decoder subsequently separates Luminance (Y) and Chrominance (C) from the input signal by using a comb filter. The comb filter then applies band-pass filtering to the C signal and band-stop filtering to the Y signal. The C signal is then de-modulated back to the base-band region. A low-pass filter then band-limits both the de-modulated C signal and the Y signal. Finally, the band-limited Y and C signals are converted to Red, Green, and Blue outputs.

Composite signals allocate Y and C in three-dimensional spectral positions in a three-dimensional spectral space. When represented in a one-dimensional or a two-dimensional subspace of the three-dimensional spectral space, the spectrum of Y and C overlap each other. Therefore, only three-dimensional comb filters can separate Y and C from a digitized composite image sequence completely.

Currently, only a few high performance adaptive three-dimensional Y/C comb filters exist for digital color decoders. Moreover, if the type and location of each edge can be determined, the Y/C comb filter can separate the Y from the C clearly to improve the performance.

However, even the more sophisticated comb filter designs today lack a proper adaptive decision-making model.

Some comb filters employ an "after-searching-edge adaptive method". This method first detects whether an edge exists on the current sample pixel, and operates a comb filter in the direction at which the edge lies. This method performs well for color edges, but poorly for colorless edges.

Alternatively, some comb filters employ an "after-searching-color adaptive method". This method first extracts a color signal from a TV signal, and operates a comb filter in the direction of the color signal with minimum energy. This method performs well for colorless edges, but poorly for color edges.

Accordingly, an adaptive decision-making model that determines the type and location of each edge for comb filters is needed.

BRIEF DESCRIPTION OF THE DRAWINGS

The accompanying drawings that are incorporated in and form a part of this specification illustrate embodiments of the invention and together with the description, serve to explain the principles of the invention.

DETAILED DESCRIPTION

The following description is presented to enable one of ordinary skill in the art to make and use the invention and is provided in the context of a patent application and its requirements. In the following description, specific nomenclature is set forth to provide a thorough understanding of the present invention. It will be apparent to one skilled in the art that the specific details may not be necessary to practice the present invention. Furthermore, various modifications to the embodiments will be readily apparent to those skilled in the art and the generic principles herein may be applied to other embodiments. Thus, the present invention is not intended to be limited to the embodiments shown but is to be accorded the widest scope consistent with the principles and features described herein.

Figure 1:
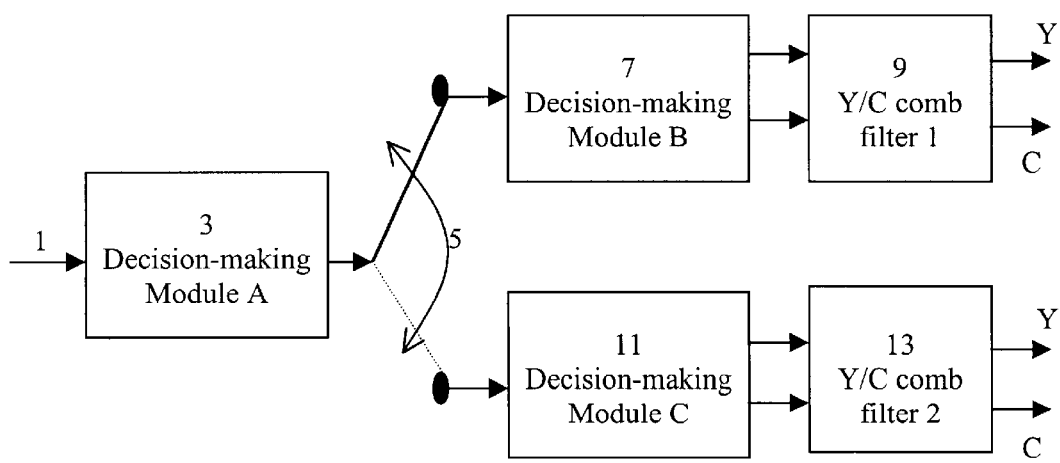
FIG. 1 is a block diagram illustrating a decision-making process for an adaptive color decoder, in accordance with one embodiment of the present invention.

FIG. 1 illustrates a block diagram 100 for an adaptive three-dimensional color TV color decoder in accordance with one embodiment of the present invention. Block diagram 100 comprises: a composite TV signal input denoted 1, a first decision-making module denoted 3, a switch denoted 5, a second decision-making module denoted 7, a first Y/C comb filter denoted 9, a third decision-making module denoted 11, and a second Y/C comb filter denoted 13.

FIG. 1 shows that the decision-making modules 3, 7, and 11 adjust accordingly to edge type and direction conditions in order to adaptively filter composite TV signals into the two elements Y and C.

As shown in FIG. 1, a composite TV signal 1 inputs to a color decoder that outputs two elements Luminance (Y) and Chrominance (C), separated from the input signal by one of the two Y/C comb filters 9 or 13.

Moreover, switch 5 in FIG. 1 illustrates that decision-making module 3 selects one of the two decision-making modules 7 and 11 based on the type of edge (i.e. color or colorless) across the current sample pixel.

Once decision-making module 3 selects one of the two decision-making modules 7 or 11, wherein the selected decision-making module 7 or 11 filters input signal 1 with an appropriate Y/C comb filter based on the various edge directions (i.e. horizontally, vertically, or temporally) across the current sample pixel.

Figure 2:
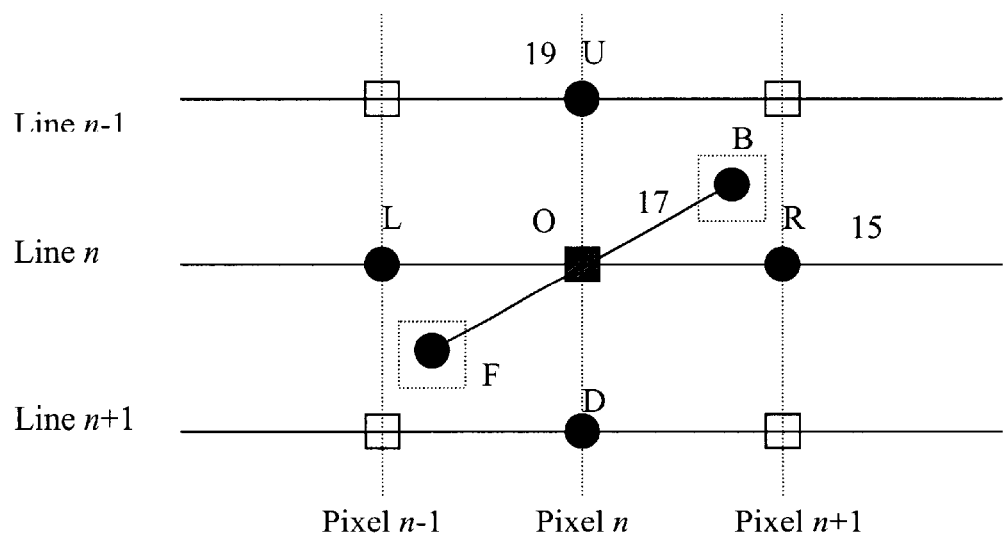
FIG. 2 illustrates a first decision-making module for determining if an edge is color or colorless, in accordance with one embodiment of the present invention.

Referring now to FIG. 2 in light of FIG. 1. FIG. 2 shows a three-dimensional sample space 200 relied upon by decision-making module 3 shown in FIG. 1. Three-dimensional sample space 200 comprises: a current sample pixel denoted O, a horizontal axis denoted 15, a temporal axis denoted 17, and a vertical axis denoted 19.

As understood herein, an edge is not limited to a two-dimensional sample space. For example, in a three-dimensional sample space such as that illustrated by sample space 200, an edge may lie along horizontal axis 15, vertical axis 19, or temporal axis 17.

As shown in FIG. 2, the three axes 15, 17, and 19 intersect at current sample pixel O. FIG. 2 further shows six adjacent pixels surrounding the current sample pixel O, denoted L, R, U, D, F, B respectively.

Moreover, the pixels U and D are vertical neighboring pixels of O, the pixels L and R are horizontal neighboring pixels of O, and the pixels F and B are temporal neighboring pixels of O.

As shown in FIG. 1, decision-making module 3 selects one of two decision-making modules 7 or 11 based on the type of edge (i.e. color or colorless edge) across current sample pixel O in the three-dimensional sample space.

Furthermore, decision-making module 3 in FIG. 1 uses three-dimensional sample space 200 to determine the color type of the edge across current sample pixel O by comparing a pre-determined threshold value to an output value calculated with a formula $|6P(O)-P(F)-P(B)-P(U)-P(D)-P(L)-P(R)|$, where the function $P(X)$ is understood herein after to return the pixel value of a pixel X. The threshold value is an adjustable value that may be determined experimentally or set to a default value.

As understood herein, the invention is not limited to the formula described above. For example, in another embodiment, a variation of the formula may be $|12P(O)-2P(F)-2P(B)-2P(U)-2P(D)-2P(L)-2P(R)|$.

If the output value is less than the threshold value, then decision-making module 3 designates the edge passing through the current sample O as a colorless edge. A colorless edge is understood as an edge whose spectral energy is consisted almost entirely of Luminance (Y) and the energy of Chrominance (C) is considered trivial (i.e. less than the threshold value).

Thus, if the output value $|6P(O)-P(F)-P(B)-P(U)-P(D)-P(L)-P(R)|$ is less than the pre-determined threshold value, decision-making module 3 as shown in FIG. 1 selects decision-making module 7 with switch 5.

Conversely, if the output value $|6O-F-B-U-D-L-R|$ is greater than the pre-determined threshold value, decision-making module 3 designates the edge passing through the current sample pixel O as a color edge, and selects decision-making module 11 with switch 5. A color edge is understood as an edge whose energy is consisted of both elements Luminance (Y) and Chrominance (C).

Figure 3:
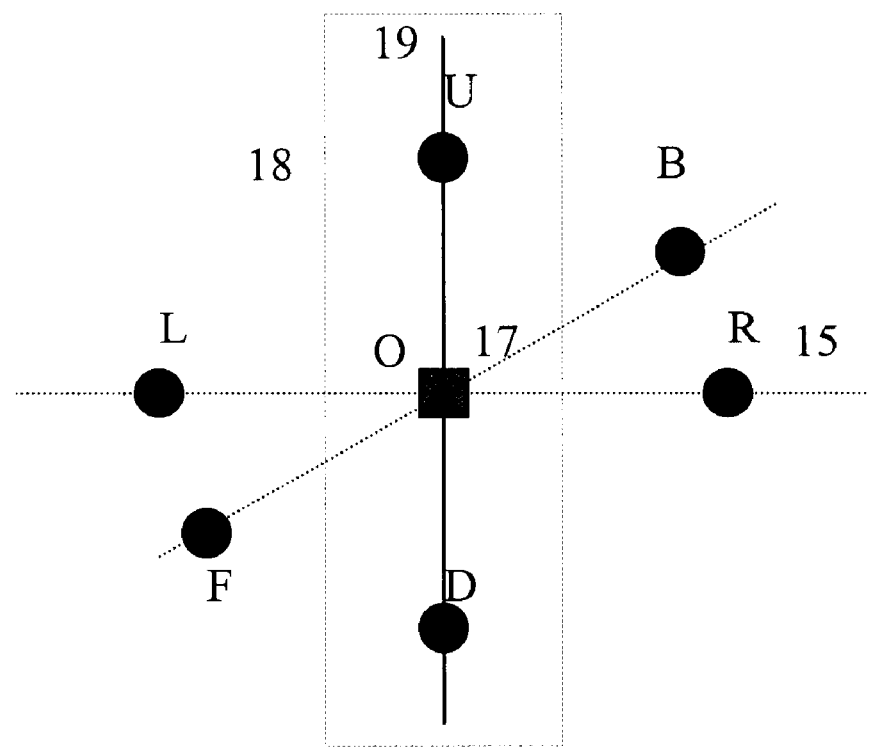
FIG. 3 illustrates a color or colorless edge laid in the vertical direction, in accordance with one embodiment of the present invention.

FIG. 3 illustrates a color or colorless edge denoted 18 laid in the vertical axis 19 passing through current sample O in three-dimensional sample space 200 in accordance with one embodiment of the present invention.

Referring now to FIG. 3 in light of FIG. 1 and FIG. 2 with respect to decision-making module 7, where edge 18 is a colorless edge.

Decision-making module 7 selects an appropriate one-dimensional Y/C comb filter from one or more one-dimensional Y/C comb filters for edge 18 by evaluating three values $|P(U)-P(D)|$, $|P(L)-P(R)|$, and $|P(F)-P(B)|$, where each value corresponds to the axis vertical, horizontal, and temporal respectively.

For a colorless edge laid in the vertical axis 19 through the current sample pixel O and in motion such as edge 18, the value $|P(U)-P(D)|$ is the smallest due to the fact that U and D have similar values in the same edge location.

Accordingly, decision-making module 7 applies an appropriate one-dimensional vertical Y/C comb filter to edge 18 for minimizing edge blurring. The adaptive Y/C color decoder shown in FIG. 1 effectively maintains sharp colorless edges by adjusting first to the color type and then the direction of each edge.

Furthermore, if two or more values $|P(U)-P(D)|$, $|P(L)-P(R)|$, and $|P(F)-P(B)|$ are equal, a default descending priority order is set as temporal, horizontal, and vertical.

Referring now to FIG. 3 in light of FIG. 1 and FIG. 2 with respect to decision-making module 11, where edge 18 is a color edge.

Decision-making module 11 selects an appropriate one-dimensional Y/C comb filter from one or more one-dimensional Y/C comb filters for edge 18 by evaluating three values $|2P(O)-P(U)-P(D)|$, $|2P(O)-P(L)-P(R)|$, and $|2P(O)-P(F)-P(B)|$, where each value corresponds to the axis vertical, horizontal, and temporal respectively.

Furthermore, for a color edge laid in the vertical axis 19 through the current sample pixel O and in motion such as edge 18, the value $|2P(O)-P(U)-P(D)|$ produces the smallest color energy suppressing the Y energy.

Accordingly, decision-making module 11 applies an appropriate one-dimensional vertical Y/C comb filter to edge 18 for minimizing color edge blurring. The adaptive Y/C color decoder shown in FIG. 1 effectively maintains sharp color edges by first adjusting to the color type and then the direction of each edge.

Furthermore, if two or more values $|2P(O)-P(U)-P(D)|$, $|2P(O)-P(L)-P(R)|$, and $|2P(O)-P(F)-P(B)|$ are equal, a default descending priority order is set as temporal, horizontal, and vertical.

Figure 4:
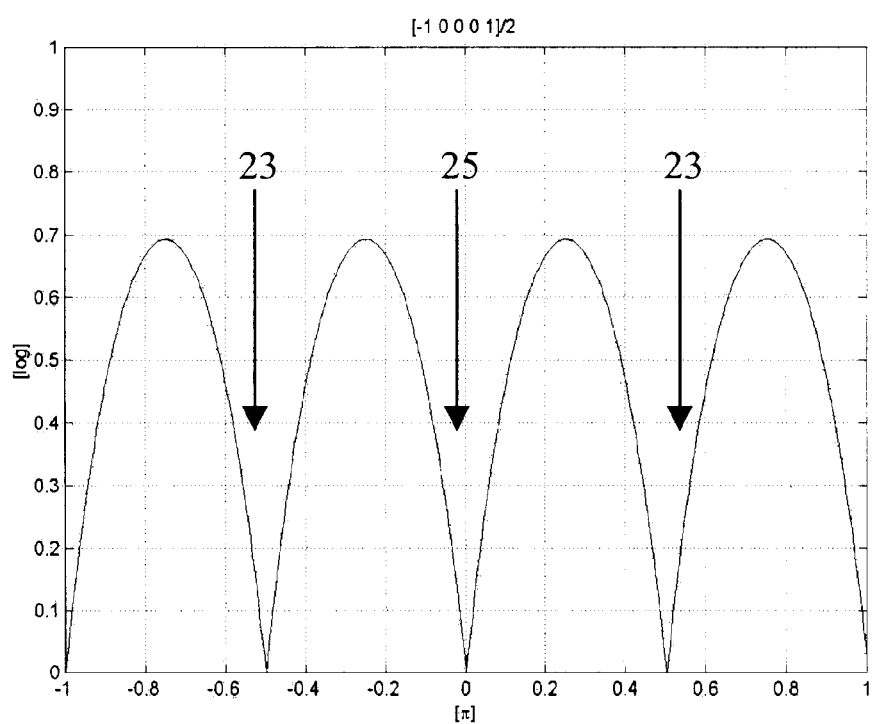
FIG. 4 illustrates a spectral profile of a Y/C comb filter adapted for a colorless edge in accordance with one embodiment of the present invention.

FIG. 4 illustrates a spectral profile used by Y/C comb filter 9. As shown in FIG. 4, Y/C comb filter 9 suppresses the main lobes (i.e. major C and Y energies denoted 23, 25 respectively) but preserves high frequency energies or edge information.

For instance, if a colorless edge is laid in the vertical direction between U and R through current sample pixel O, the value $|P(U)-P(D)|$ corresponding to the vertical direction produces the smallest energy difference among the three values $|P(U)-P(D)|$, $|P(L)-P(R)|$, and $|P(F)-P(B)|$, thereby indicating that the edge lies vertically.

Figure 5:
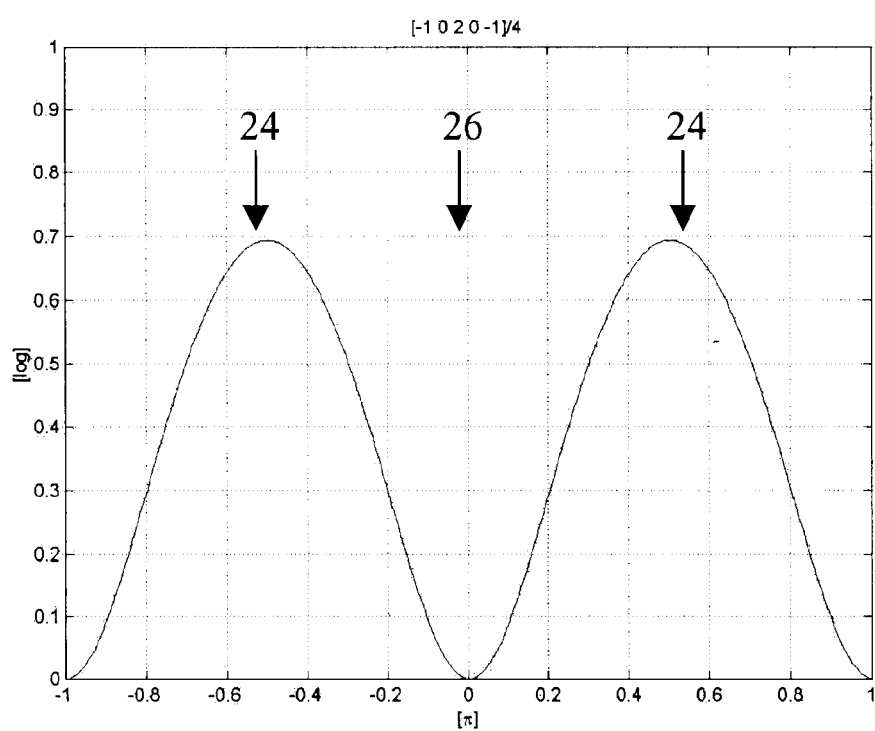
FIG. 5 illustrates a spectral profile of a Y/C comb filter adapted for a color edge in accordance with one embodiment of the present invention.

FIG. 5 illustrates a spectral profile used by Y/C comb filter 13. As shown in FIG. 5, Y/C comb filter 13 suppresses the main lobes (i.e. major Y energies denoted 26) but preserves the color energy (i.e. C energies denoted 24).

For instance, if a color edge is laid in the vertical direction between U and R through current sample pixel O, then the value $|2P(O)-P(U)-P(D)|$ corresponding to the vertical direction produces the smallest energy difference among the three values $|2P(O)-P(U)-P(D)|$, $|2P(O)-P(L)-P(R)|$, and $|2P(O)-P(F)-P(B)|$, thereby indicating that the edge lies vertically.

Figure 6:
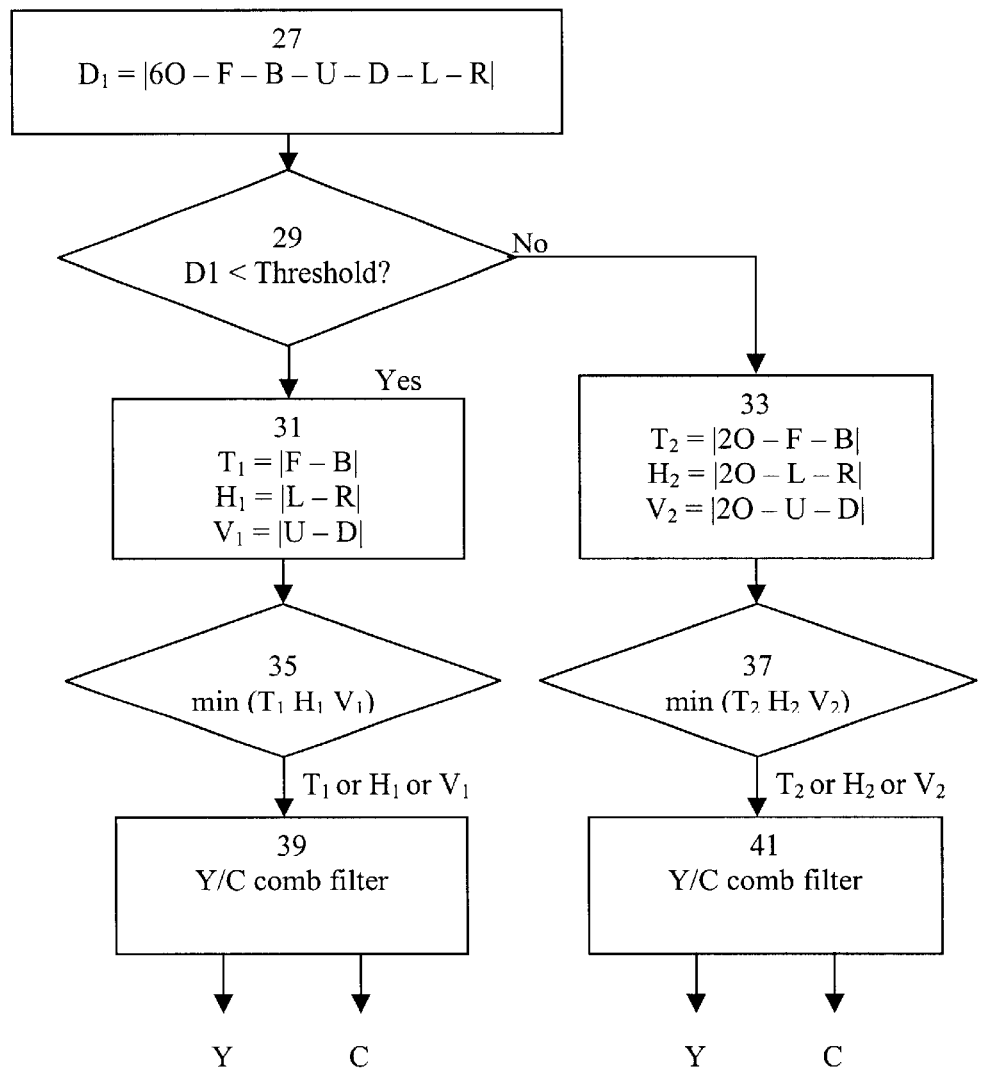
FIG. 6 illustrates a flow chart that outlines steps of a method for selecting an appropriate Y/C comb filter, in accordance with one embodiment of the present invention.

FIG. 6 is a flow diagram 600 that illustrates the steps for selecting a comb filter in accordance with one embodiment of the present invention.

Referring now to FIG. 6 in light of FIG. 1, FIG. 2, and FIG. 3. Step 27 shows that a first decision-making module calculates the formula $|6P(O)-P(F)-P(B)-P(U)-P(D)-P(L)-P(R)|$ and assigns the output value to $D_1$, where the variable O is a current sample pixel, and the variables F, B, U, D, L, and R are six adjacent pixels surrounding the current sample pixel O as shown in FIG. 2.

Moreover, the pixels U and D are vertical neighboring pixels of O, the pixels L and R are horizontal neighboring pixels of O, and the pixels F and B are temporal neighboring pixels of O.

The value of $D_1$ determines the type of edge (i.e. color or colorless) passing through the current sample pixel O. If $D_1$ is greater than a pre-determined threshold value, the first decision-making module designates that a color edge is passing through current sample O, else the first decision-making module designates that a colorless edge is passing through O.

Step 29 determines whether $D_1$ is less than the pre-determined threshold value. The threshold value is an adjustable value that may be determined experimentally or set to a default value.

If the value of $D_1$ is less than the pre-determined threshold value, thereby indicating that a colorless edge is passing through O, a second decision-making module determines three values $T_1$, $H_1$, and $V_1$ by calculating $|P(F)-P(B)|$, $|P(U)-P(D)|$, and $|P(L)-P(R)|$ respectively in step 31.

Moreover, the three values $T_1$, $H_1$, and $V_1$ correspond to temporal, horizontal, and vertical axis respectively.

Steps 35 further illustrates that the second decision-making module determines the minimum of the three values $T_1$, $H_1$, and $V_1$, and selects an appropriate one-dimensional Y/C comb filter from one or more one-dimensional Y/C comb filters for the direction corresponding to the minimum value. The selected filter then filters the input composite TV signal in step 39.

If the value of $D_1$ is greater than the pre-determined threshold value, thereby indicating that a color edge is passing through O, a third decision-making module determines three values $T_2$, $H_2$, and $V_2$ by calculating $|2P(O)-P(F)-P(B)|$, $|2P(O)-P(F)-P(B)|$, and $|2P(O)-P(L)-P(R)|$ respectively in step 33.

Moreover, the three values $T_2$, $H_2$, and $V_2$ correspond to temporal, horizontal, and vertical axis respectively.

Steps 37 further illustrates that the third decision-making module determines the minimum of the three values $T_2$, $H_2$, and $V_2$, and selects an appropriate one-dimensional Y/C comb filter from one or more one-dimensional Y/C comb filters for the direction corresponding to the minimum value. The selected filter then filters the input composite TV signal in step 41.

Although the invention has been described in connection with several embodiments, it is understood that this invention is not limited to the embodiments disclosed, but is capable of various modifications that would be apparent to a person skilled in the art.

For example, FIG. 3 illustrates a vertical edge passing through current sample pixel O, the edge may also be horizontal or temporal and the corresponding conditions and minimum values adjusted to accommodate such an edge in the horizontal or temporal direction.

Although only one-dimensional vertical Y/C comb filters have been mentioned in the above descriptions, the one-dimensional Y/C comb filters comprise at least one vertical, one horizontal, and one temporal one-dimensional Y/C comb filter.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the arts to best utilize the invention and various embodiments with various modifications as are suited to the particular use contemplated. It is intended that the scope of the invention be defined by the Claims appended hereto and their equivalents.

I claim:

1. A method for separating Luminance (Y) and Chrominance (C) of a composite TV signal, comprising the steps of:
    a) determining if an edge passing through a current sample pixel is color or colorless, the edge represented within a three-dimensional sampling space having a temporal axis, a horizontal axis, and a vertical axis;
    b) in response to the edge determined to be colorless, filtering the edge using a first Y/C comb filter adapted for filtering a colorless edge; and
    c) in response to the edge determined to be color, filtering the edge using a second Y/C comb filter adapted for filtering a color edge.

2. The method of claim 1, wherein said first filter is adapted to suppress the main lobes of major Chrominance (C) energies and the main lobes of major Luminance (Y) energies of the composite TV signal, said first filter also preserves the high frequency energies.

3. The method of claim 1, wherein said second filter is adapted to suppress the main lobes of Luminance (Y) energies of the composite TV signal, said second filter also preserves the color energy.

4. The method of claim 1, wherein said step (a) further comprising the steps of:
    a1) generating a gray level difference according to a formula involving pixel values of pixels O, F, B, U, D, L, and R; wherein O is the current sample pixel, F and B are temporal neighboring pixels of O, U and D are vertical neighboring pixels of O, and L and R are horizontal neighboring pixels of;
    a2) in response to the gray level difference being less than a threshold value, designating the edge as a colorless edge;
    a3) in response to the gray level difference being greater than a threshold value, designating the edge as a color edge.

5. The method of claim 4, wherein the formula is specified as $|6P(O)-P(F)-P(B)-P(U)-P(D)-P(L)-P(R)|$, where the function $P(X)$ returns the pixel value of a pixel X.

6. The method of claim 4, wherein the threshold value is experimentally determined.

7. The method of claim 1, wherein said step (b) further comprising the steps of:
    b1) generating gray level differences ($dT_1$, $dH_1$, and $dV_1$) according respectively to a first formula involving pixel values of pixels F and B; a second formula involving pixel values of pixels L and R; and a third formula involving pixel value of pixels U and D; wherein F and B are temporal neighboring pixels of the current sample pixel, L and R are horizontal neighboring pixels of the current sample pixel, and U and D are vertical neighboring pixels of the current sample pixel;
    b2) in response to the minimum of $dT_1$, $dH_1$, and $dV_1$ being $dT_1$, selecting a one-dimensional temporal comb filter as said first filter to filter spectral energy corresponding to said edge;
    b3) in response to the minimum of $dT_1$, $dH_1$, and $dV_1$ being $dH_1$, selecting a one-dimensional horizontal comb filter as said first filter to filter spectral energy corresponding to said edge; and
    b4) in response to the minimum of $dT_1$, $dH_1$, and $dV_1$ being $dV_1$, selecting a one-dimensional vertical comb filter as said first filter to filter spectral energy corresponding to said edge.

8. The method of claim 7, wherein the first formula is specified as $|P(F)-P(B)|$, where the function $P(X)$ returns the pixel value of a pixel X.

9. The method of claim 7, wherein the second formula is specified as $|P(L)-P(R)|$, where the function $P(X)$ returns the pixel value of a pixel X.

10. The method of claim 7, wherein the third formula is specified as $|P(U)-P(D)|$, where the function $P(X)$ returns the pixel value of a pixel X.

11. The method of claim 1, wherein said step (c) further comprising the steps of:

c1) generating gray level differences ($dT_2$, $dH_2$, and $dV_2$) according respectively to a first formula involving pixel values of pixels O, F, and B; a second formula involving pixel values of pixels O, L, and R; and a third formula involving pixel value of pixels O, U, and D; wherein O is the current sample pixel, F and B are temporal neighboring pixels of the current sample pixel, L and R are horizontal neighboring pixels of the current sample pixel, and U and D are vertical neighboring pixels of the current sample pixel;

c2) in response to the minimum of $dT_2$, $dH_2$, and $dV_2$ being $dT_2$, selecting a one-dimensional temporal comb filter as said second filter to filter spectral energy corresponding to said edge;

c3) in response to the minimum of $dT_2$, $dH_2$, and $dV_2$ being $dH_2$, selecting a one-dimensional horizontal comb filter as said second filter to filter spectral energy corresponding to said edge; and c4) in response to the minimum of $dT_2$, $dH_2$, and $dV_2$ being $dV_2$, selecting a one-dimensional vertical comb filter as said second filter to filter spectral energy corresponding to said edge.

12. The method of claim 11, wherein the first formula is specified as $|2P(O)-P(F)-P(B)|$, where the function $P(X)$ returns the pixel value of a pixel X.

13. The method of claim 11, wherein the second formula is specified as $|2P(O)-P(L)-P(R)|$, where the function $P(X)$ returns the pixel value of a pixel X.

14. The method of claim 11, wherein the third formula is specified as $|2P(O)-P(U)-P(D)|$, where the function $P(X)$ returns the pixel value of a pixel X.

15. A decoder for a TV composite signal, comprising:

a first decision-making module adapted to determine if an edge passing through a current sample pixel is color or colorless;

a first plurality of comb filters adapted to be selected by said first decision module in response to the edge being determined to be colorless, the first plurality of comb filters specifically adapted to filter colorless edge; and a second plurality of comb filters adapted to be selected by said first decision module in response to the edge being determined to be color, the second plurality of comb filters specifically adapted to filter color edge.

16. The decoder of claim 15, wherein the first decision-making module is adapted to generate a gray level difference according to a formula involving pixel values of pixels O, F, B, U, D, L, and R; wherein O is the current sample pixel, F and B are temporal neighboring pixels of O, U and D are vertical neighboring pixels of O, and L and R are horizontal neighboring pixels of O.

17. The decoder of claim 15, further comprising a second decision-making module coupled to the first decision-making module, wherein the second decision-making module is adapted to generate gray level differences ($dT_1$, $dH_1$, and $dV_1$) according respectively to a first formula involving pixel values of pixels F and B; a second formula involving pixel values of pixels L and R; and a third formula involving pixel value of pixels U and D; wherein F and B are temporal neighboring pixels of the current sample pixel, L and R are horizontal neighboring pixels of the current sample pixel, and U and D are vertical neighboring pixels of the current sample pixel.

18. The decoder of claim 17, wherein the first formula is specified as $|F-B|$.

19. The decoder of claim 17, wherein the second formula is specified as $|L-R|$.

20. The decoder of claim 17, wherein the third formula is specified as $|U-D|$.

21. The decoder of claim 15, further comprising a third decision-making module coupled to the first decision-making module, wherein the third decision-making module is adapted to generate gray level differences ($dT_2$, $dH_2$, and $dV_2$) according respectively to a first formula involving pixel values of pixels O, F, and B; a second formula involving pixel values of pixels O, L, and R; and a third formula involving pixel value of pixels O, U, and D; wherein O is the current sample pixel, F and B are temporal neighboring pixels of the current sample pixel, L and R are horizontal neighboring pixels of the current sample pixel, and U and D are vertical neighboring pixels of the current sample pixel.

22. The decoder of claim 21, wherein the first formula is specified as $|2O-F-B|$.

23. The decoder of claim 21, wherein the second formula is specified as $|2O-L-R|$.

24. The decoder of claim 21, wherein the third formula is specified as $|2O-U-D|$.

25. The decoder of claim 15, wherein a filter of the first plurality of comb filters is a one-dimensional filter adapted to filter the edge along a temporal axis, said filter adapted to suppress the main lobes of major Chrominance (C) energies and the main lobes of major Luminance (Y) energies of the composite TV signal, said filter also preserves the high frequency energies.

26. The decoder of claim 15, wherein a filter of the first plurality of comb filters is a one-dimensional filters adapted to filter the edge along a horizontal axis, said filter adapted to suppress the main lobes of major Chrominance (C) energies and the main lobes of major Luminance (Y) energies of the composite TV signal, said filter also preserves the high frequency energies.

27. The decoder of claim 15, wherein a filter of the first plurality of comb filters is a one-dimensional filters adapted to filter the edge along a vertical axis, said filter adapted to suppress the main lobes of major Chrominance (C) energies and the main lobes of major Luminance (Y) energies of the composite TV signal, said filter also preserves the high frequency energies.

28. The decoder of claim 15, wherein a filter of the second plurality of comb filters is a one-dimensional filters adapted to filter the edge along a temporal axis, said filter adapted to suppress the main lobes of Luminance (Y) energies of the composite TV signal, said filter also preserves the color energy.

29. The decoder of claim 15, wherein a filter of the second plurality of comb filters is a one-dimensional filters adapted to filter the edge along a horizontal axis, said filter adapted to suppress the main lobes of Luminance (Y) energies of the composite TV signal, said filter also preserves the color energy.

30. The decoder of claim 15, wherein a filter of the second plurality of comb filters is a one-dimensional filters adapted to filter the edge along a vertical axis, said filter adapted to suppress the main lobes of Luminance (Y) energies of the composite TV signal, said filter also preserves the color energy.

* * * * *

UNITED STATES PATENT AND TRADEMARK OFFICE
CERTIFICATE OF CORRECTION

PATENT NO. : 6,795,126 B1
DATED : September 21, 2004
INVENTOR(S) : Lee

It is certified that error appears in the above-identified patent and that said Letters Patent is hereby corrected as shown below:

Column 6,
Line 29, "pixels of;" should read -- pixels of O. --.
Line 32, "colorless edge;" should read -- colorless edge. --.

Signed and Sealed this

Twenty-sixth Day of July, 2005

JON W. DUDAS
*Director of the United States Patent and Trademark Office*